(12) United States Patent  
Suzuki (10) Patent No.: US 7,055,539 B2
(45) Date of Patent: Jun. 6, 2006

(54) ELECTROMAGNETIC VALVE CONTROL DEVICE AND METHOD

(75) Inventor: Masakuni Suzuki, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 323 days.

(21) Appl. No.: 10/637,676

(22) Filed: Aug. 11, 2003

(65) Prior Publication Data

US 2004/0035469 A1 Feb. 26, 2004

(30) Foreign Application Priority Data

Aug. 26, 2002 (JP) .............................. 2002-245044

(51) Int. Cl.
*F16K 37/00* (2006.01)
*F16K 31/02* (2006.01)

(52) U.S. Cl. .................... 137/1; 137/552; 137/553; 251/129.01; 251/129.15; 251/64; 303/119.2

(58) Field of Classification Search ................ 137/552, 137/553, 554, 1; 251/64, 129.15, 129.01; 303/119.1, 119.2
See application file for complete search history.

(56) References Cited

U.S. PATENT DOCUMENTS

RE32,035 E * 11/1985 Kuroiwa et al. ............ 361/154

| 5,320,123 A | 6/1994 | Corso et al. |
| 5,477,149 A | 12/1995 | Spencer et al. |
| 5,951,118 A | 9/1999 | Soejima |
| 6,321,781 B1 * | 11/2001 | Kurth .................... 137/554 |

FOREIGN PATENT DOCUMENTS

| DE | 41 10 254 A1 | 10/1992 |
| JP | A 10-24826 | 1/1998 |
| JP | A-10/47138 | 2/1998 |
| JP | A-11-301441 | 11/1999 |
| JP | A-2000-71973 | 3/2000 |
| JP | A 2000-248967 | 9/2000 |
| JP | A 2001-342855 | 12/2001 |
| JP | A 2001-349461 | 12/2001 |

* cited by examiner

*Primary Examiner*—Kevin Lee
(74) *Attorney, Agent, or Firm*—Oliff & Berridge, PLC (57) ABSTRACT

A normally closed electromagnetic valve is closed again after temporarily being opened during an abnormality check of the valve. When the valve is opened, electricity is supplied so that a plunger is moved by a coil but a back face of the plunger does not abut against a receiving face of a fixed portion. Because the plunger does not strike the fixed portion, no impact noise is generated. Also, when the valve is closed, the electricity is not instantly dropped to zero, but is gradually reduced. As a result, impact noise when the valve strikes the valve seat is able to be reduced.

24 Claims, 9 Drawing Sheets

| VOLTAGE / TEMPERATURE | $T_0$ OR LOWER | $T_0 < t \leq T_1$ | $T_1 < t \leq T_2$ | $t \geq T_2$ |
|---|---|---|---|---|
| $V_0 \geq V$ | $\alpha_0$ | $\alpha_1$ | $\alpha_2$ | $\alpha_3$ (msec) |
| $V_0 < V$ | $\beta_0$ | $\beta_1$ | $\beta_2$ | $\beta_3$ (msec) |

$\alpha_0 \geq \alpha_1 \geq \alpha_2 \geq \alpha_3$

$\beta_0 \geq \beta_1 \geq \beta_2 \geq \beta_3$ $\alpha_i \geq \beta_i \quad i = 0, 1, 2, 3$

ELECTROMAGNETIC VALVE CONTROL DEVICE AND METHOD

INCORPORATION BY REFERENCE

The disclosure of Japanese Patent Application No. 2002-245044 filed on Aug. 26, 2002, including the specification, drawings and abstract is incorporated herein by reference in its entirety.

BACKGROUND OF THE INVENTION

1. Field of the Invention

The invention relates to an electromagnetic valve control device that controls an electromagnetic valve, and more particularly to an electromagnetic valve control device that controls a current supplied to the electromagnetic valve when checking for an abnormality.

2. Description of the Related Art

JPA 10-24826 discloses an electromagnetic valve control device which includes i) an electromagnetic valve that has a) a seating valve having a valve seat and a valve that can be placed against and separated from the valve seat, and b) an electromagnetic driving device which includes a coil retained in a body and a plunger that moves relative to the body when electricity is supplied to the coil, and which places the valve against, and separates the valve from, the valve seat by moving the plunger, and ii) a current control device that controls the current supplied to the coil of the electromagnetic valve. During an initial check, this current control device performs a power check, in which it supplies the coil with electricity of an amount such that the plunger does not move. Further, when the vehicle has reached a predetermined speed, the current control device supplies the coil with more electricity than during the power check. This electricity causes the valve to move so as to prevent it from sticking. When the valve hits the valve seat at this time, a loud impact noise is generated when the plunger contacts the body. However, because the vehicle is travelling at or faster than the predetermined speed, occupants in the vehicle are not bothered by the noise.

SUMMARY OF THE INVENTION

The object of the invention is to reduce the noise generated by operation of the electromagnetic valve during an abnormality check. This object can be achieved by constructing the electromagnetic valve control device according to any one of the following various aspects.

A first aspect of the invention relates to an electromagnetic valve control system having: an electromagnetic valve including (i) a seating valve having a valve seat and a valve that can be placed against and separated from the valve seat, and (ii) an electromagnetic driving device which includes a coil retained in a body of the electromagnetic valve and a plunger that moves relative to the body when electricity is supplied to the coil, and which places the valve against, and separates the valve from, the valve seat by moving the plunger; and a controller for controlling supply of electricity to the coil. The controller is adapted to, during an abnormality check of the electromagnetic valve, supply the coil with electricity of an amount that causes the plunger to move a length shorter than a length of a maximum stroke of the plunger.

According to this construction, during an abnormality check, the coil is supplied with electricity of an amount which causes the plunger to move a length shorter than a length of the maximum stroke of the plunger. That is, the plunger moves from an initial position thereof to a position closer to the initial position than the maximum stroke position. Thus, the plunger does not abut against a member or a portion limiting the movement of the plunger during supply of electricity. As a result, the noise that may be generated during an abnormality check can be reduced or hopefully eliminated.

The amount of supply electricity depends on power level and time during which the electricity is supplied (i.e., will hereinafter be referred as "power-ON time" where appropriate). As predetermined constant voltage is usually supplied to the coil during an abnormality check, the amount of supply electricity is determined in accordance with the power-ON time. According to the first aspect of the invention, the amount of electricity supplied to the coil is set smaller than necessary for causing the plunger to move to the maximum stroke position. Thus, when the supplied voltage is constant, the power-ON time is made shorter. As a result, the abnormality check is completed more quickly than when the plunger is moved to the maximum stroke position. The amount of electricity supplied during an abnormality check is determined by a test or the like beforehand.

When the plunger is made to move to the maximum stroke position, a large noise or vibration may be generated when the plunger strikes the body of the electromagnetic valve or when the valve strikes the valve seat. These noise and vibration can be detected. As will be described later, the controller may be constructed to detect whether the plunger has moved. Thus, it is possible to determine an amount of electricity that moves the plunger but does not cause a noise and vibration as aforementioned.

Also, when voltage is applied to the coil, current does not immediately start increasing, but starts increasing after a delay corresponding to a time constant that is specific to each circuit. Also, when voltage is applied and current increases, thus supplying electricity of an amount which causes the plunger to move, there is a delay due to inertia, and the like, before the plunger actually starts moving. The current for moving the plunger to the maximum stroke position as normal operation current is specific to each circuit. By determining changes in current after application of voltage (i.e., changes in waveform), therefore, it is possible to find a length of the power-ON time that moves the plunger but does not make current reach the normal operation level.

Next, a second aspect of the invention relates to an electromagnetic valve control system having an electromagnetic valve including (i) a seating valve having a valve seat and a valve that can be placed against and separated from the valve seat, and (ii) an electromagnetic driving device which includes a coil retained in a body of the electromagnetic valve and a plunger that moves relative to the body when electricity is supplied to the coil, and which places the valve against, and separates the valve from, the valve seat by moving the plunger; and a controller for controlling supply of electricity to the coil. According to this control system, the controller is adapted to, during an abnormality check of the electromagnetic valve, supply the coil with a smaller amount of electricity than an amount which causes the plunger to move from an initial position to and remain in an end of a maximum stroke of the plunger.

According to this construction, an amount of electricity supplied to the coil during an abnormality check is set smaller than an amount to be supplied when a command to move the plunger to the maximum stroke position (i.e., command to perform a full operation of the electromagnetic valve) has been issued during normal control mode, or an amount to be supplied with the related art during an abnormality check. In these cases, according to the related art, a larger amount of electricity than necessary for moving the plunger to the maximum stroke position is supplied. According to the second aspect of the invention, however, the amount of supplied electricity is set smaller than the amount necessary for moving the plunger to the maximum stroke position. This results in smaller noise being generated when the plunger strikes a member or a portion limiting the movement of the plunger (e.g., body of the electromagnetic valve) or when the valve strikes the valve seat, as compared to during an abnormality check in the related art. Namely, according to the second aspect of the invention, noise generated during an abnormality check is reduced or hopefully eliminated.

In the electromagnetic valve control system according to the first and second aspects of the invention, it is preferable that the controller be adapted to supply the coil with a larger amount of electricity than a minimum amount to move the plunger.

According to this construction, the plunger is reliably moved during an abnormality check, thus using a smaller amount of electricity than when power check and driving of the valve for preventing it from sticking are separately carried out.

Also, it is preferable that the controller be adapted to perform at least one of an ON-OFF control for turning on/off current to be supplied to the coil and a linear control for controlling current to be supplied to the coil so as to obtain a desired pressure differential between upstream and downstream sides of the electromagnetic valve.

Further, the electromagnetic valve may be an electromagnetic valve that is switched between an open state and a closed state by turning on/off supply current (i.e., performing On-Off control of current), or an electromagnetic linear valve with which pressure differential between the upstream and downstream sides is able to be controlled to a desired value by controlling supply current to the electromagnetic valve.

In the electromagnetic valve control system according to the first and second aspects of the invention and their modification examples described above, it is preferable that: the electromagnetic valve include a spring that urges the valve in a direction to place the valve against the valve seat; the electromagnetic valve be a normally-closed type electromagnetic valve in which, when electricity is supplied to the coil, the plunger is drawn toward the body of the electromagnetic valve against the urging force of the spring so as to push the valve away from the valve seat; and the maximum stroke be equal to a length between the position of the plunger when the valve is placed against the valve seat and the position of the plunger when the plunger abuts against the body of the electromagnetic valve.

According to this construction where the electromagnetic valve is constructed as a normally-closed type electromagnetic valve, when current is applied to the coil, electromagnetic force occurs to draw the plunger toward the body while separating the valve away from the valve seat, so that the electromagnetic valve is switched to be in a closed state. The maximum stroke of the plunger may be equal to a length between the position of the plunger when the valve is placed against the valve seat and the position of the plunger when the plunger abuts against the body.

In the electromagnetic valve control system according to the first and second aspects of the invention and their modification examples described above, it is preferable that: the electromagnetic valve include a spring that urges the plunger in a direction to push the valve away from the valve seat; the electromagnetic valve be a normally-opened type electromagnetic valve in which, when electricity is supplied to the coil, the plunger is drawn against the urging force of the spring so as to place the valve against the valve seat; and the maximum stroke be equal to a length between the position of the plunger when the valve is farthest from the valve seat within a limited range over which the valve can move away from the valve seat and the position of the plunger when the valve is placed against the valve seat.

According to this construction where the electromagnetic valve is constructed as a normally-opened type electromagnetic valve, when current is applied to the coil, electromagnetic force occurs to draw the plunger toward the body while separating the valve away from the valve seat, so that the electromagnetic valve is switched to be in a closed state. The maximum stroke of the plunger is equal to a length between the position of the plunger when the valve may be placed against the valve seat and the position of the plunger when the plunger abuts against the body.

In the electromagnetic valve control system according to the first and second aspects of the invention and their modification examples described above, it is preferable that the controller be adapted to detect whether at least one of the plunger and the valve has moved.

In this case, the controller may be adapted to determine at least one of the position of the plunger or the valve relative to the body of the electromagnetic valve and whether the plunger or the valve has been stationary.

For example, the controller may be adapted to detect the relative position of the plunger based on a magnetic change resulting from relative movement between the plunger and the body of the electromagnetic valve, thus performing "non-contact position detection." Detecting such the relative position enables to determine whether the plunger or the valve has moved or has been stationary.

Also, the controller may be adapted to detect pressure in at least one of the high pressure side and the low pressure side of the valve. That is, when the position of the valve changes relative to the valve seat, pressure either in the high pressure side or lower pressure side of the valve changes.

Also, the controller may be adapted to detect current flowing through the coil (preferably, waveform of current flowing through the coil). When voltage is applied to the coil, it gives a waveform of current which is specific to inductance of the coil, and so on, and the inductance of the coil changes as the position of the plunger relative to the body of the electromagnetic valve (i.e., the space between the plunger and the body) changes. By detecting current when voltage is applied to the coil, therefore, it is possible to determine whether the plunger has moved relative to the body of the electromagnetic valve.

In the electromagnetic valve control system according to the first and second aspects of the invention and their modification examples described above, it is preferable that the controller be adapted to detect at least one of (i) waveform of current flowing through the coil, (ii) noise generated when the plunger strikes the body of the electromagnetic valve or noise generated when the valve strikes the valve seat, (iii) vibration of the electromagnetic valve, and (iv) pressure in high pressure or low pressure side of the valve.

According to this construction, for example, when the valve or plunger moves to its maximum stroke position and strikes the valve seat or the body of the electromagnetic valve, it produces a large contact noise, and causes an intense vibration of the electromagnetic valve. Monitoring such noise or vibration, therefore, it is possible to determine whether the valve or plunger has abutted against the valve seat or the body of the electromagnetic valve.

When the electromagnetic valve is constructed to be capable of controlling fluid pressure, the pressure in the high or low pressure side of the valve changes as the valve moves relative to the valve seat. Detecting the fluid pressure (in particular, a change in the fluid pressure), therefore, it is possible to determine whether the valve has moved relative to the valve seat. When the electromagnetic valve is constructed to be capable of controlling fluid pressure of working fluid, the controller may be adapted to detect the fluid pressure. Similarly, when the electromagnetic valve is constructed to be capable of controlling air pressure, the controller may be adapted to detect the air pressure.

In the electromagnetic valve control system according to the first and second aspects of the invention and their modification examples described above, it is preferable that the controller be adapted to determine an abnormality in the electromagnetic valve if no movement of at least one of the plunger and the valve is detected even when electricity is supplied to the coil.

During an abnormality check, the coil is supplied with a larger amount of electricity than a minimum amount necessary for moving the plunger. Thus, it is considered that, when supplying electricity to the coil, the plunger moves, and the valve accordingly moves. Therefore, when no movement of the plunger or the valve has been detected, i.e., when it is detected that the plunger or the valve has been stationary, a sticking abnormality of the electromagnetic valve can be detected.

In the electromagnetic valve control system according to the first and second aspects of the invention and their modification examples described above, it is preferable that the controller be adapted to increase an amount of electricity to be supplied to the coil if no movement of at least one of the plunger and the valve seat is not detected even when electricity is supplied to the coil.

The amount of supply electricity depends on voltage (to be applied) and time during which the electricity is supplied (i.e., power-ON time). That is, the amount of electricity is larger as the applied voltages is higher and/or the power-ON time is longer. In view of this, the controller may be adapted to increase at least one of the voltage applied and the power-ON time.

In this case, the controller may increase the amount of supply electricity by a predetermined amount or an amount that is determined each time.

Further, the controller may be adapted to increase the amount of supply electricity when no movement of the plunger or the valve has been detected, and determine an sticking abnormality of the electromagnetic valve when no movement nevertheless has been detected after increasing the amount of supply electricity. Alternatively, the controller may detect a sticking abnormality of the electromagnetic valve when no movement is detected after repeating a specific number of cycles of increasing the supply electricity and detecting the movement.

In the electromagnetic valve control system according to the first and second aspects of the invention and their modification examples described above, it is preferable that: the electromagnetic valve be disposed in a fluid line in which a working fluid flows; and the controller be adapted to detect a temperature of the working fluid and set a larger amount of electricity to be supplied to the coil when the detected temperature is low than when the detected temperature is high.

When the temperature of the working fluid is low, the viscosity of the fluid increases, i.e., its viscous resistance increases, which hinders the movement of the plunger and valve. Thus, when the temperature of the working fluid is low, a larger amount of electricity is preferably supplied to the coil than when the temperature of the working fluid is high. According to this construction, it is possible to set an amount of electricity that is appropriate for environment during an abnormality check. Also, when a small amount of electricity is supplied to the coil while the temperature of the working fluid is low, a sticking abnormality may be erroneously detected. However, when the amount of supply electricity is set in accordance with the working fluid temperature as mentioned above, it avoids such an erroneous detection of an sticking abnormality due to a low temperature of the working fluid.

Regarding setting of supply electricity, for example, a table indicating a relationship between the working fluid temperature and supply electricity amount (or relational expressions) may be pre-stored in the controller, or the like, and the controller may determine a supply electricity amount based on the temperature detected and the table.

The controller may directly detect the temperature of the working fluid or may detect a specific temperature corresponding to the temperature of the working fluid temperature. For example, since it is considered that the working fluid temperate is almost equal to the outside air temperature when an abnormality check is executed as or as one process of an initial check, the controller may refer to the outside air temperature as the working fluid temperature.

In this case, if the electromagnetic valve control system is constructed to be capable of controlling air pressure, the controller may be adapted to detect air temperature.

In the electromagnetic valve control system according to the first and second aspects of the invention and their modification examples described above, it is preferable that the controller be adapted to gradually reduce electricity when stopping supplying the electricity to the coil.

In the electromagnetic valve control system according to the first and second aspects of the invention and their modification examples described above, it is preferable that: the electromagnetic valve be disposed between a brake cylinder that operates using fluid pressure and one of a high pressure source and low pressure source; and the controller be adapted to control the fluid pressure of the brake cylinder by controlling current to be supplied to the coil. According to this construction, the electromagnetic control valve can be applied to a brake fluid pressure control system.

A third aspect of the invention relates to a method for controlling an electromagnetic valve including (i) a seating valve having a valve seat and a valve that can be placed against and separated from the valve seat, and (ii) an electromagnetic driving device which includes a coil retained in a body of the electromagnetic valve and a plunger that moves relative to the body when electricity is supplied to the coil, and which places the valve against, and separates the valve from, the valve seat by moving the plunger. In this method, during an abnormality check of the electromagnetic valve, the coil is supplied with electricity of an amount which causes the plunger to move a length shorter than a length of a maximum stroke of the plunger.

A fourth aspect of the invention relates to a method for controlling an electromagnetic valve including (i) a seating valve having a valve seat and a valve that can be placed against and separated from the valve seat, and (ii) an electromagnetic driving device which includes a coil retained in a body of the electromagnetic valve and a plunger that moves relative to the body when electricity is supplied to the coil, and which places the valve against, and separates the valve from, the valve seat by moving the plunger. In this method, during an abnormality check of the electromagnetic valve, the coil is supplied with electricity of a smaller amount than an amount which causes the plunger to move from an initial position to and remain in an end of a maximum stroke of the plunger.

BRIEF DESCRIPTION OF THE DRAWINGS

The foregoing and/or further objects, features and advantages of the invention will become more apparent from the following description of preferred embodiments with reference to the accompanying drawings, in which like numerals are used to represent like elements and wherein.

DETAILED DESCRIPTION OF THE PREFERRED EMBODIMENTS

A case in which an electromagnetic valve control device according to one exemplary embodiment of the invention is applied as a brake fluid pressure control device which controls a fluid pressure of a brake cylinder will be described. The brake fluid pressure control device controls the fluid pressure of brake cylinders of a brake system shown in FIG. 1.

Figure 1:
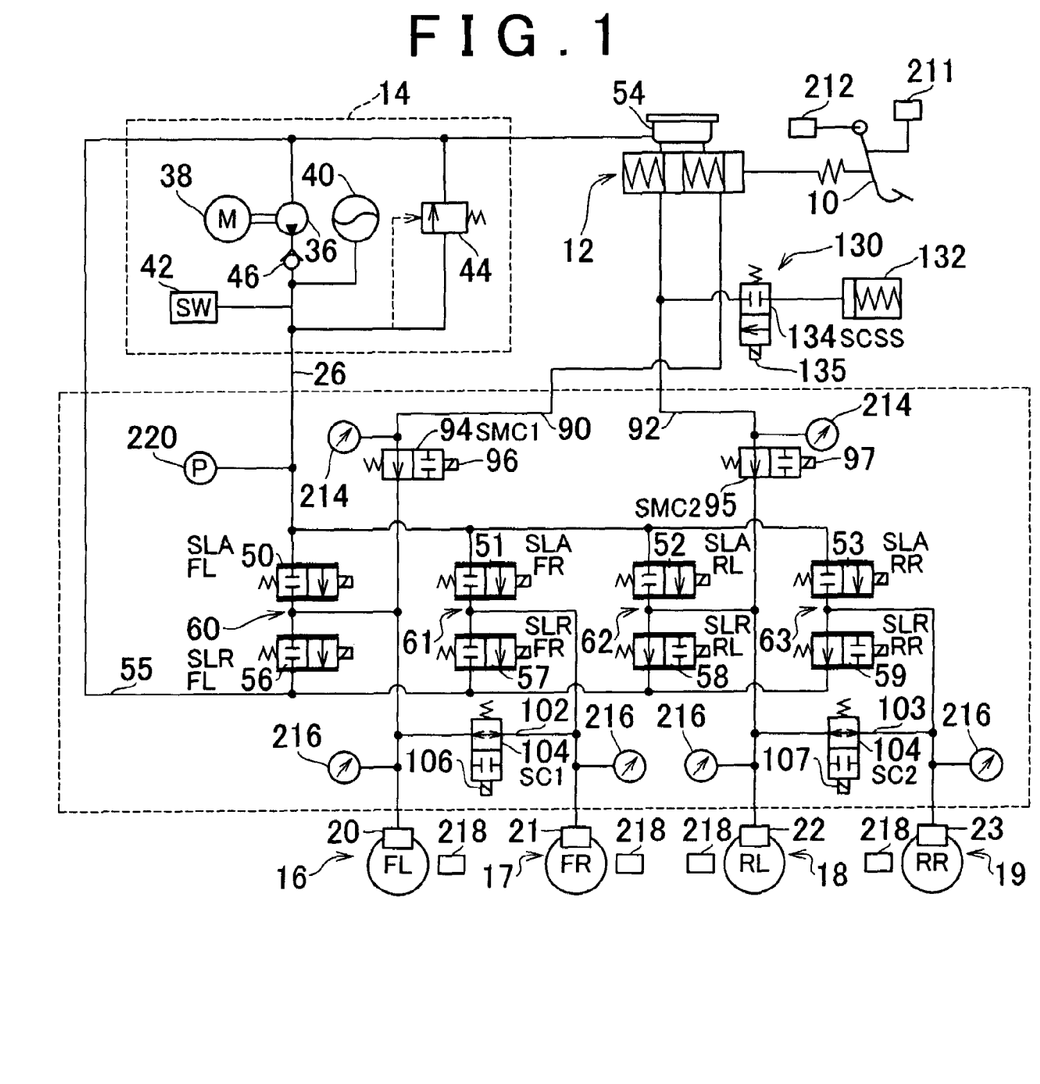
FIG. 1 is a circuit diagram showing a brake system that includes a brake fluid pressure control device as an electromagnetic valve control device which is one exemplary embodiment of the invention.

The brake system shown in the drawing includes a brake pedal 10 as a brake operating member, a master cylinder 12 that includes two pressure chambers, a pump apparatus 14 as a power fluid pressure generating device that is operated with power, and brakes 16 to 19 provided for left and right front and rear wheels, respectively. The brakes 16 and 17 are right and left front wheel brakes, and the brakes 18 and 19 are left and right rear wheel brakes. Brake cylinders 20 to 23 for the four brakes 16 to 19 are connected to the pump apparatus 14 by a brake line 26 such that brake fluid from the pump apparatus 14 is supplied to the brake cylinders 20 to 23 via the brake line 26 to operate the brakes 16 to 19.

The pump apparatus 14 includes a pump 36 and a pump motor 38 which drives the pump 36. High pressure brake fluid discharged from the pump 36 is stored in an accumulator 40. A fluid pressure switch 42 detects whether the fluid pressure of the brake fluid stored in the accumulator 40 is within a predetermined range. A relief valve 44 prevents the fluid pressure of the brake fluid discharged from the pump 36 from becoming too great. Further, a check valve 46 is provided between the pump 36 and the accumulator 40. This check valve 46 prevents the brake fluid in the accumulator 40 from flowing back toward the pump 36.

Figure 2:
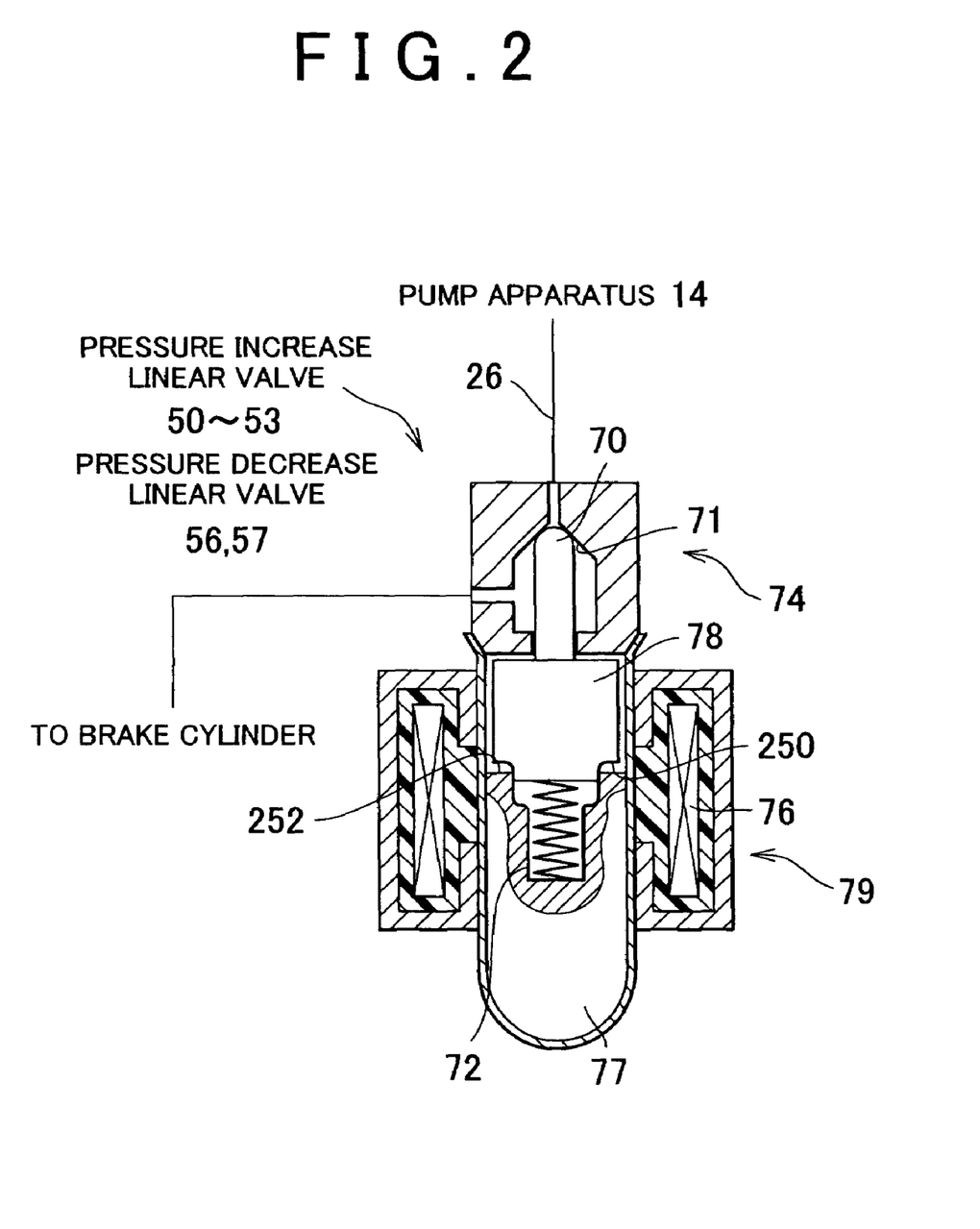
FIG. 2 is a sectional view schematically showing a normally closed electromagnetic valve included in the brake fluid pressure control device.

Pressure increase linear valves 50 to 53 are provided in the brake line 26, and pressure decrease linear valves 56 to 59 are provided in a brake line 55 which connects the brake cylinders 20 to 23 with the master cylinder reservoir 54. The pressure increase linear valve 50 together with the pressure decrease linear valve 56 makes up a linear valve unit 60. Similarly, the pressure increase linear valves 51 to 53 together with the corresponding pressure decrease linear valves 57 to 59 make up the linear valve units 61 to 63, respectively. The fluid pressures of the brake cylinders 20 to 23 are able to be controlled independently by controlling the linear valve units 60 to 63, respectively. Hereinafter in the specification, when it is not necessary to distinguish between the pressure increase linear valves 50 to 53 and the pressure decrease linear valves 56 to 59, they will simply be referred to as "linear valves." The pressure increase linear valves 50 to 53 and the front wheel side pressure decrease linear valves 56 and 57 are normally closed (NC) electromagnetic control valves. The rear wheel side pressure decrease linear valves 58 and 59 are normally open (NO) electromagnetic control valves. As shown in FIG. 2, the pressure increase linear valves 50 to 53 and the pressure decrease linear valves 56 and 57 each include a seating valve 74, which includes a valve 70, a valve seat 71 and a spring 72, and a solenoid 79, which includes a coil 76, a fixed portion 77 as a body which retains the coil 76, and a plunger 78 as a moveable portion that moves with respect to the fixed portion 77 according to a current supplied to the coil 76.

When current is not being supplied to the coil 76, in the seating valve 74, urging force of the spring 72 acts on the valve 70 so as to urge it toward the valve seat 71 while pressure differential force from the front-back pressure differential acts on the valve 70 so as to draw it away from the valve seat 71. While the urging force of the spring 72 is greater than the pressure differential force, the seating valve 74 remains closed, but when the pressure differential force becomes greater than the urging force of the spring 72, the valve 70 is drawn away from the valve seat 71 such that the seating valve 74 opens. Because the pressure increase linear valves 50 to 53 are arranged between the pump apparatus 14 and the brake cylinders, the pressure differential between the fluid pressure of the pump apparatus 14 and the fluid pressure of each brake cylinder is applied to the respective pressure increase linear valves 50 to 53. The pressure decrease linear valves 57 and 58 are arranged between the brake cylinders and the master cylinder reservoir 54. Because the fluid pressure of the master cylinder reservoir 54 is approximately atmospheric pressure, the pressure differential force from the fluid pressure of the brake cylinders acts on the pressure decrease linear valves 57 and 58.

When current is supplied to the coil 76, electromagnetic driving force is generated that draws the plunger 78 toward the fixed portion 77. This electromagnetic force acts on the valve 70 so as to draw it away from the valve seat 71. When the urging force of the spring 72 (in the direction toward the valve seat) and the pressure differential force and the electromagnetic driving force (in the direction away from the valve seat) are applied in the seating valve 74, and the relationship among these forces determines the position of the valve 70 relative to the valve seat 71. Controlling the current supplied to the coil 76 enables the front-back pressure differential, and thus the brake cylinder fluid pressure, to be controlled.

Figure 3:
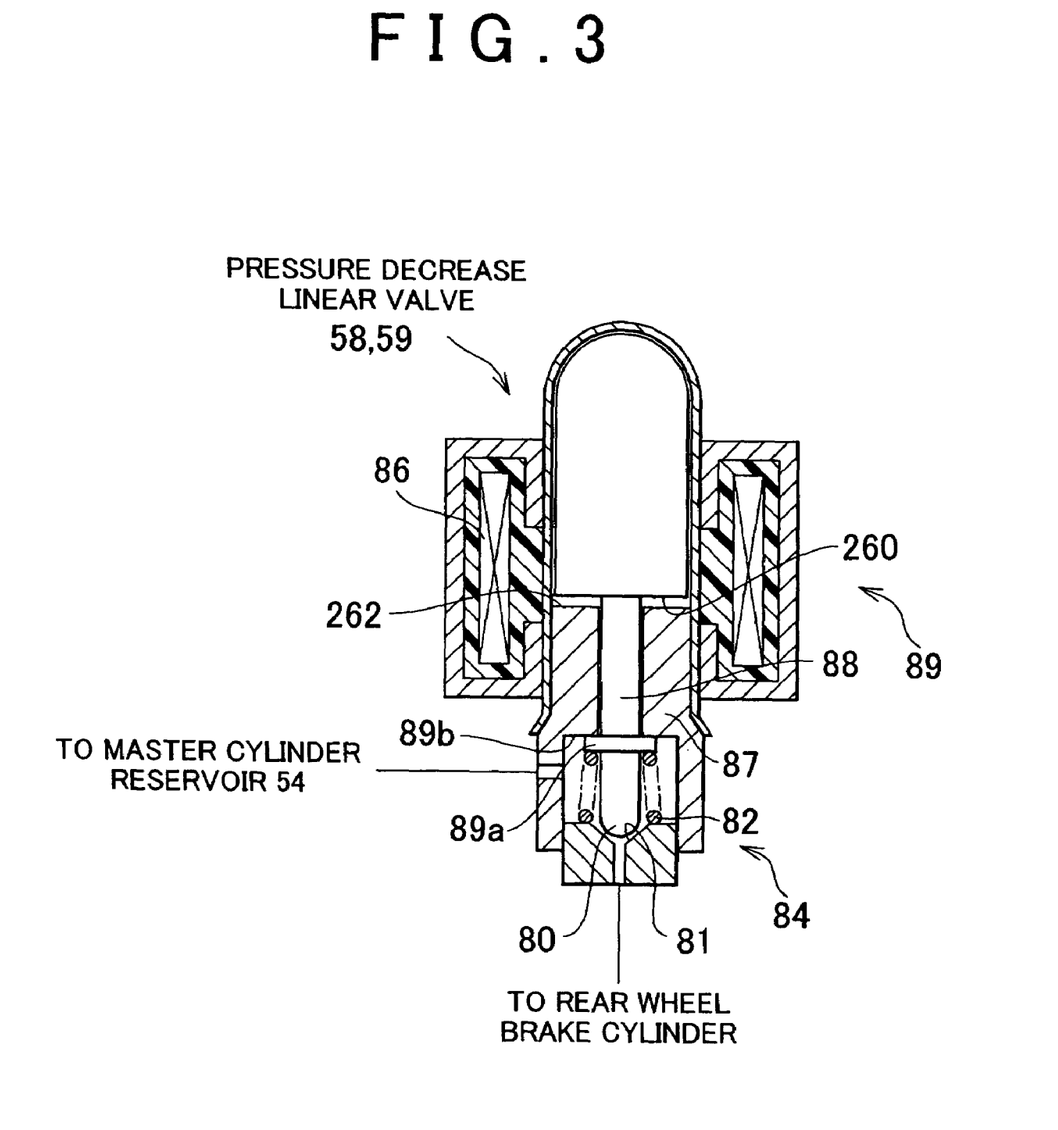
FIG. 3 is a sectional view schematically showing a normally open electromagnetic valve included in the brake fluid pressure control device.

As shown in FIG. 3, the pressure decrease linear valves 58 and 59 each include a seating valve 84, which includes a valve 80, a valve seat 81 and a spring 82, and a solenoid 89, which includes a coil 86, a fixed portion 87 as the main body, and a plunger 88 that moves relative to the fixed portion 87 according to a current supplied to the coil 86. The spring 82 is provided in a state such that urging force thereof acts on the valve 80 so as to push the valve 80 away from the valve seat 81. The extent to which the valve 80 is pushed away from the valve seat 81 is restricted by a stopper 89a provided on the plunger 88 which abuts against a front end face 89b of the fixed portion 87. When current is supplied to the coil 86, the plunger 88 is drawn toward the fixed portion 87. The electromagnetic driving force then acts on the valve 80 to draw it toward the valve seat 81. The urging force of the spring 82, and the pressure differential force (which acts in the direction away from the valve seat) and the electromagnetic driving force (which acts in the direction toward the valve seat) all act in the seating valve 84, and the relationship between the urging force and the pressure differential force and the electromagnetic driving force determines the position of the valve 80 relative to the valve seat 81.

In this exemplary embodiment, a target fluid pressure of the brake cylinder fluid pressure is determined so that the braking force required by the driver is obtained, and the currents supplied to the coils 76 and 86 of the pressure increase linear valves 50 to 53 and the pressure decrease linear valves 56 to 59 are all controlled such that the actual brake cylinder fluid pressure becomes the target fluid pressure.

In the two pressure chambers of the master cylinder 12, a fluid pressure according to the operating force is generated in accordance with an operation of the brake pedal 10 by the driver. The brake cylinder 20 of the left front wheel 16 is connected to one of the two pressure chambers of the master cylinder 12 via a first master cylinder brake line 90 and the brake cylinder 22 of the left rear wheel 18 is connected to the other pressure chamber of the master cylinder 12 via a second master cylinder brake line 92. A first master cylinder cut-off valve 94 is disposed midway in the first master cylinder brake line 90 and a second master cylinder cut-off valve 95 is disposed midway in the second master cylinder brake line 92. The first and second master cylinder cut-off valves 94 and 95 are operated by controlling the electricity supplied to the coils 96 and 97 ON and OFF. The first and second master cylinder cut-off valves 94 and 95 are normally open (NO) valves that are open when electricity is not being supplied to the coils 96 and 97 (i.e., electricity to the coils is off), and closed when electricity is being supplied coils 96 and 97 (i.e., electricity to the coils is on).

Further, the left and right front wheel brake cylinders 20 and 21 are connected together via a first connecting line 102. Similarly, the left and right brake cylinders 22 and 23 are connected together via a second connecting line 103. A first connection control valve 104 is connected to the first connecting line 102 and a second connection control valve 105 is connected to the second connecting line 103. The first connection control valve 104 and second connection control valve 105 are normally open (NO) valves which are open when electricity is not being supplied to the coils 106 and 107 (i.e., electricity to the coils is off), respectively, and closed when electricity is being supplied to the coils 106 and 107 (i.e., electricity to the coils is on), respectively.

In this way, the front and rear wheel brake cylinders 20 and 22 on the left side are connected to separate pressure cylinders of the master cylinder 12, while the two brake cylinders on the front wheel side are connected together by the first connecting line 102 and the two cylinders on the rear wheel side are connected together by the second connecting line 103. Therefore, when the first and second master cylinder cut-off valves 94 and 95 are both open and the first connection control valve 104 and second connection control valve 105 are both open, all of the brakes 16 to 19 are operated according to the brake fluid of the master cylinder 12. Thus, this brake system is divided into two circuits: a front brake circuit and a rear brake circuit.

A stroke simulator apparatus 130 is provided in the second master cylinder brake line 92. This stroke simulator apparatus 130 includes a stroke simulator 132 and a normally closed (NC) simulator check valve 134. Controlling the electricity to the coil 135 of the simulator check valve 134 ON and OFF switches the simulator check valve 134 so as to connect or disconnect the stroke simulator 132 to/from the master cylinder 12. In this exemplary embodiment, when the brakes 16 to 19 are operated by brake fluid from the pump apparatus 14, electricity is supplied to the coil 135 (i.e., ON) to switch the simulator check valve 134 so that the stroke simulator 132 is connected with the master cylinder 12. When the brakes 16 to 19 are operated according to the brake fluid from the master cylinder 12, electricity stops being supplied to the coil 135 (i.e., OFF) so that the simulator check valve 134 switches to disconnect the stroke simulator 132 from the master cylinder 12. The simulator check valve 134 is a normally closed (NC) valve.

Figure 4:
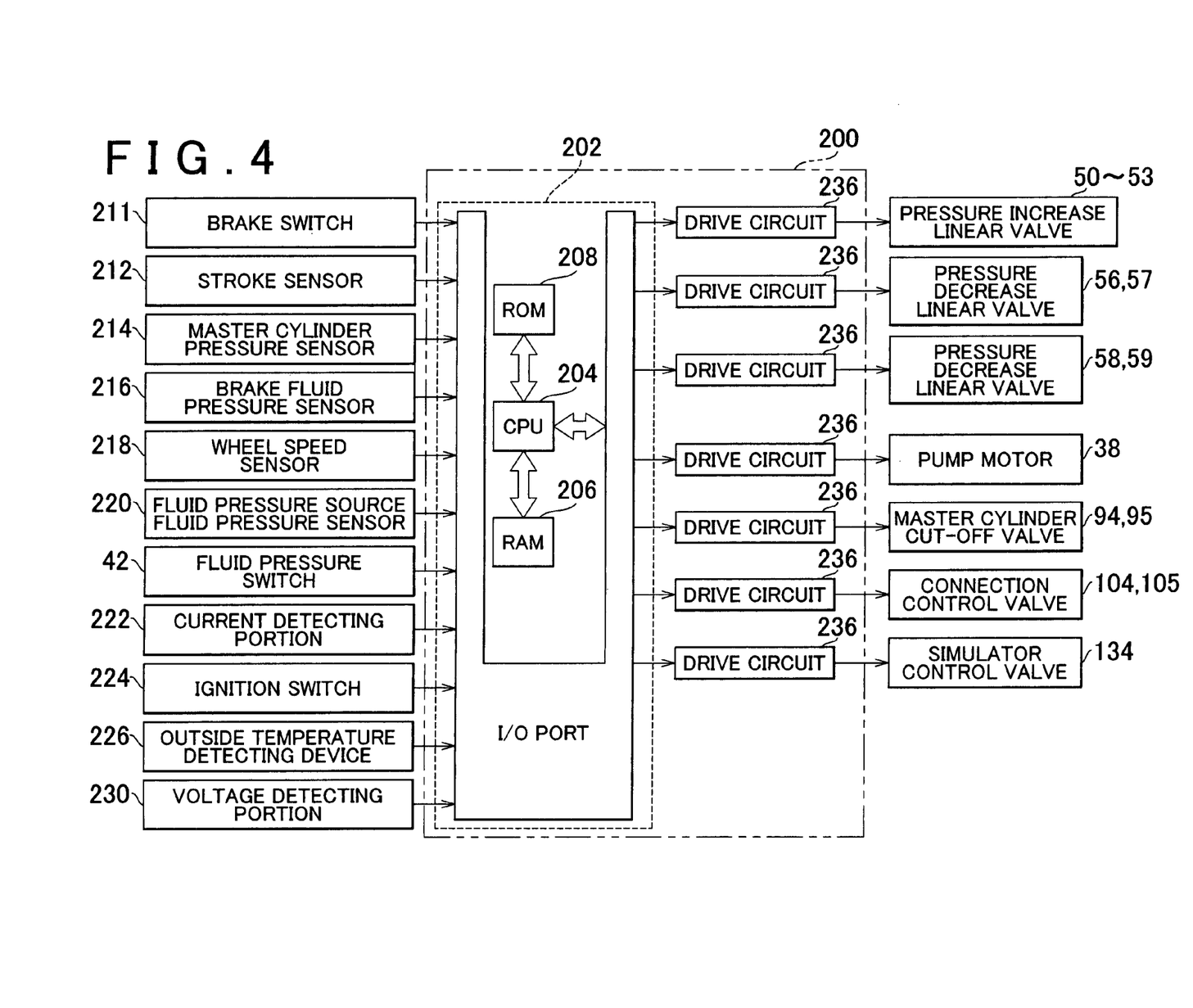
FIG. 4 is a view showing peripheral components around a brake ECU included in the brake fluid pressure control device.

Each of the electromagnetic valves and the like of the brake system is controlled based on commands from the brake ECU 200 shown in FIG. 4. The brake ECU 200 includes a controlling portion 202, the main component of which is a computer, and a plurality of drive circuits. The controlling portion 202 includes a CPU 204, RAM 206, ROM 208, and an I/O port 210 and the like. To the I/O port 210 are connected a fluid pressure switch 42, a brake switch 211, a stroke sensor 212, a master cylinder pressure sensor 214, a brake fluid pressure sensor 216, a wheel speed sensor 218, a fluid pressure source fluid pressure sensor 220, a current detecting portion 222 which detects currents flowing to the coils in the pressure increase linear valves 50 to 53 and the pressure decrease linear valves 56 to 59, an ignition switch 224, an outside air temperature detecting device 226 which detects the temperature of the outside air, a voltage detecting portion 230 which detects a voltage applied to the coils 76 and 86, and the like. The coils for the pressure increase linear valves 50 to 53, the pressure decrease linear valves 56 to 59, the first and second master cylinder cut-off valves 94 and 95, the first and second connection control valves 104 and 105, and the simulator check valve 134, as well as the pump motor 38 and the like are also connected to the I/O port 210 via a drive circuit 236. The fluid pressure source fluid pressure sensor 220 is provided midway in the brake line 26 which connects the pressure increase linear valves 50 to 53 with the pump apparatus 14. This fluid pressure source fluid pressure sensor 220 detects a fluid pressure on the high pressure side (i.e., on the pump apparatus 14 side) of the pressure increase linear valves 50 to 53. Further, a linear valve control program and an abnormality detection program and the like are stored in the ROM 208.

During normal braking, a required value of the brake cylinder fluid pressure intended by the driver is obtained based on at least one of an operation stroke of the brake pedal 10 detected by the stroke sensor 212 and a master cylinder pressure as an operating force detected by the pump apparatus 14. The linear valve units 60 to 63 are controlled such that the actual fluid pressure of the brake cylinder approaches the required value.

Further, a brake slip state of each wheel is obtained based on a wheel speed detected by the wheel speed sensor 218. When a large amount of brake slip is detected, antilock control is performed. In the antilock control, the fluid pressure of each brake cylinder is controlled separately by controlling the corresponding linear valve units 60 to 63, such that the amount of brake slip of each wheel becomes a value that is suitable for the friction coefficient of the road surface.

Figure 9:
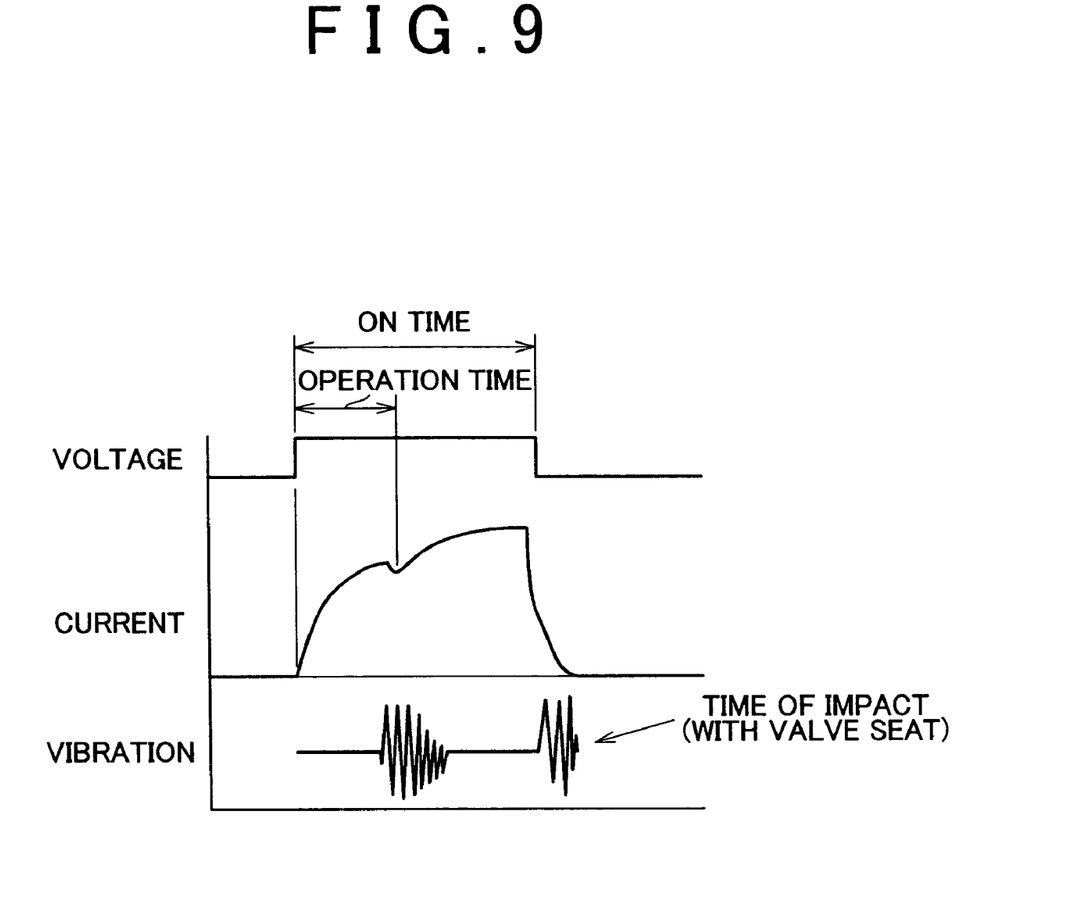
FIG. 9 is a view showing one example of control of the electromagnetic valve performed by a conventional brake fluid pressure control device.

Next, whether or not there is an abnormality in the linear valve units 60 to 63 is checked. Whether or not there is an abnormality in any of the pressure increase linear valves 50 to 53 or the pressure decrease linear valves 56 to 59 is determined. First, the check to determine whether there is an abnormality in any of the pressure increase linear valves 50 to 53 or the pressure decrease linear valves 56 and 57, which are normally closed (NC) valves, will be described. In the exemplary embodiment, the closed linear valves are opened temporarily and then closed again. Referring to FIG. 9, when a voltage of a predetermined amount is applied to the coil 76 for a predetermined amount of time, the plunger 78 is drawn toward the fixed portion 77 against the urging force of the spring 72. The valve 70 separates from the valve seat 71 and a back face 250 of the plunger 78 abuts against a receiving face 252 of the fixed portion 77. The maximum stroke of the plunger 78 is equal to the length between the initial position of the plunger 78, shown in FIG. 2 (i.e., the position of the plunger 78 when the valve 70 is seated against the valve seat 71), and the position of the plunger 78 when the back face 250 abuts against the receiving face 252 of the fixed portion 77. Then when the electricity supplied to the coil 76 is zero, the plunger 78 is pushed away from the receiving face 252 by the urging force of the spring 72 and the valve 70 strikes the valve seat 71. The plunger 78 striking the fixed portion 77 and the valve 70 striking the valve seat 71 are identifiable by vibrations generated at those times. In this way, a loud striking noise is generated when a large amount of electricity is supplied when the valve is opened. Similarly, a loud striking noise is also generated when the amount of electricity suddenly drops to zero when the valve is closed.

Figure 5:
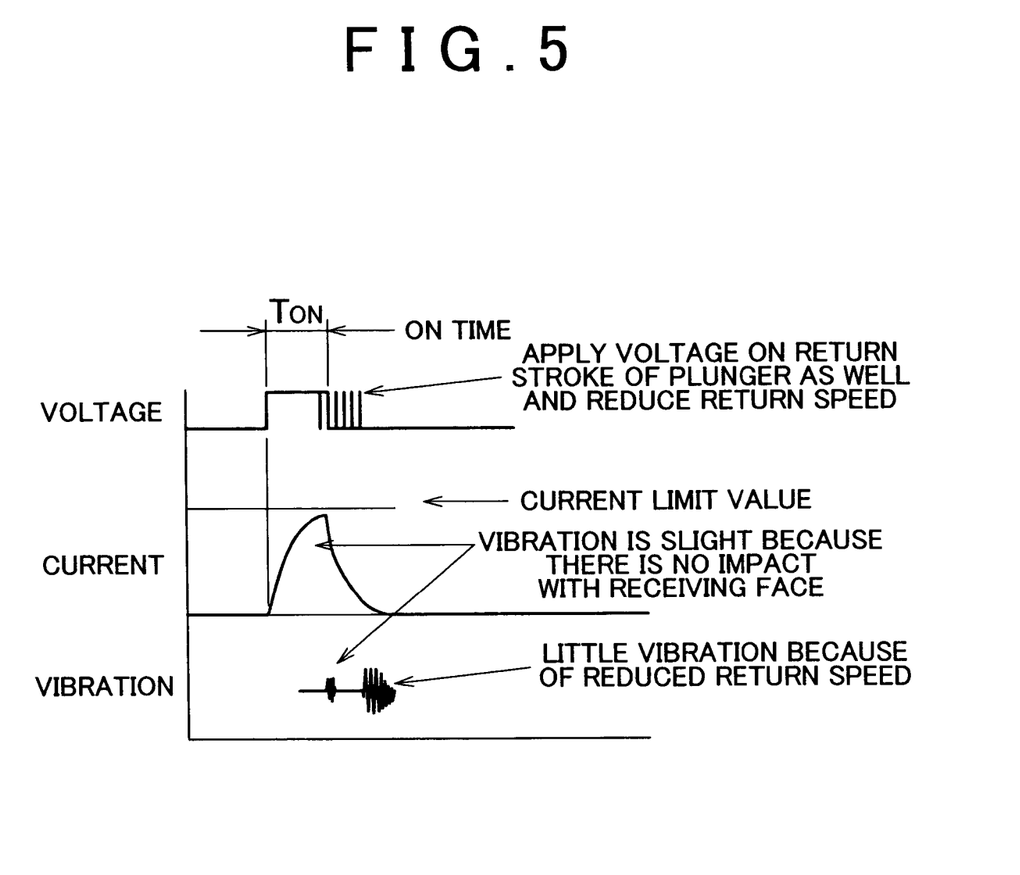
FIG. 5 is a view showing one example of control of the electromagnetic valve performed by the brake fluid pressure control device.

In contrast, in the exemplary embodiment as shown in FIG. 5, the amount of electricity supplied when the valve is opened is less than that in the related art. The amount of electricity supplied is enough to move the plunger 78, but not so much that the back face 250 of the plunger 78 strikes the receiving face 252 of the fixed portion 77. As a result, the stroke of the plunger 78 is smaller than the maximum stroke such that striking noise is not generated when the valve is opened. Further, when the valve is closed, the electricity supplied to the coil 76 is not suddenly reduced to zero, but rather is reduced gradually. As a result, it is possible to reduce the speed at which the valve 70 abuts against the valve seat 71, thus decreasing the striking noise when the valve strikes the valve seat.

In the exemplary embodiment, a movement detecting device detects whether or not the linear valve has actually been operated, i.e., whether at least one of the plunger 78 and the valve 70 has moved. It is possible to detect whether the valve 70 has moved based on the fluid pressure detected by the brake fluid pressure sensor 216. If the valve 70 in the front wheel pressure increase linear valves 50 and 51 has moved (i.e., if the linear valve is operated) while high pressure brake fluid is being supplied from the pump apparatus 14 (e.g., while the pump 36 is being operated or while high pressure brake fluid is being stored in the accumulator 40), the brake fluid pressure is increased and then maintained. Next, when the front wheel pressure decrease linear valves 56 and 57 are operated, the fluid pressure of the brake cylinder is reduced and then maintained. If the linear valve sticks (i.e., if a sticking abnormality occurs), however, the fluid pressure of the brake cylinder will not change. Also, the rear wheel pressure decrease linear valves 58 and 59 are already closed when the rear wheel pressure increase linear valves 52 and 53 are checked. When the rear wheel pressure increase linear valves 52 and 53 are operating normally, the fluid pressure of the rear wheel brake cylinders is increased and then maintained. If an abnormality occurs in which the rear wheel pressure increase linear valves 52 and 53 stick, however, the fluid pressure of the brake cylinder will not change. Therefore, it is possible to detect whether the linear valves have actually been operated, i.e., whether the valves have actually moved, based on a change, or lack thereof, of the fluid pressure of the brake cylinder.

Further, it is possible to detect whether the plunger 78 has moved based on a current waveform detected by the current detecting portion 222. A signal indicative of the current detected by the current detecting portion 222 is sent to the brake ECU 200 and the current waveform is determined. That waveform differs depending on whether the plunger 78 has moved or not. When the plunger 78 moves such that there is a gap between it and the fixed portion 77, the inductance of the coil 76 changes, resulting in a change in the current waveform. In this exemplary embodiment, a current waveform detecting device includes the current detecting portion 222 and portions of the brake ECU 200 which perform processing to obtain the current waveform from the signal sent from the current detecting portion 222 to the brake ECU 200. In this way, the movement detecting device can include the brake fluid pressure sensor 216 and the current waveform detecting device.

The amount of electricity supplied during the abnormality check, i.e., the amount of electricity that moves the plunger 78 but does not make the back face 250 strike the receiving face 252 of the fixed portion 77, is determined by a test or the like beforehand. As shown in FIG. 9, when the plunger 78 abuts against the fixed portion 77, a large vibration is generated. Further, the movement detecting device can also detect whether or not the plunger 78 has actually moved. Accordingly, if a vibration detecting device that detects vibrations in the electromagnetic valve is provided and the electricity that is supplied is adjusted while monitoring the vibrations and the detection results from the movement detecting device when determining the amount of electricity to supply (i.e., during the test), it is possible to determine the amount of electricity that moves the plunger 78 but which does not make it strike the fixed portion 77. In this exemplary embodiment, a voltage applied during the abnormality check is pre-set so the power ON time is determined.

The power ON time may be the time until the current running through the coil 76 reaches a limit value, as shown in FIG. 5. When voltage is applied to the coil 76, there is a delay in the current increase, but when the plunger 78 abuts against the fixed portion 77 and comes to be in a state of constant contact therewith, the current reaches the limit value determined in accordance with a circuit. Therefore, it is possible to obtain the power ON time as the time before the actual current that runs through the coil 76 reaches the limit value.

The pressure decrease linear valves 58 and 59, which are normally open (NO) valves, are substantially similar. In this case, the electricity supplied to the coil 86 is enough to move the plunger 88 but not enough to make an end face 260 of the plunger 88 strike a receiving face 262 of the fixed portion 87, i.e., not enough to make the valve 80 sit against the valve seat 81. Accordingly, when the valve closes, the valve 80 does not sit against the valve seat 81 so the impact noise is able to be reduced. Further, when the valve opens, the electricity supplied is reduced gradually. As a result, the noise generated from the stopper 89a abutting against the front end face 89b of the fixed portion 87 can be reduced. The maximum stroke of the plunger 88 is the length between the initial position of the plunger 88 shown in FIG. 3 (i.e., the position of the plunger 88 when the stopper 89a abuts against the front end face 89b of the fixed portion 87) and the position of the plunger 88 when the valve 80 sits against the valve seat 81. Further, there is little change in the fluid pressure of the brake cylinder during the abnormality check of the pressure decrease linear valves 58 and 59. Therefore, it is preferable in this case to detect the movement of the plunger 88 based on the current waveform as aforementioned.

In this exemplary embodiment, when no movement of the plungers 78 and 88 and the valves 70 and 80 is detected even when electricity is supplied to the coils 76 and 86, it is not immediately determined that there is a sticking abnormality; rather, the electricity is increased and if still no movement is detected at that time, then a sticking abnormality is determined to have occurred. The electricity is increased to the point where, in the normally closed (NC) valve, the plunger 78 will strike the fixed portion 77 (e.g., the electricity can be supplied as shown in FIG. 9 with the related art during the abnormality check), and in the normally open (NO) valve, the valve 80 will sit against the valve seat 81.

Figure 6:
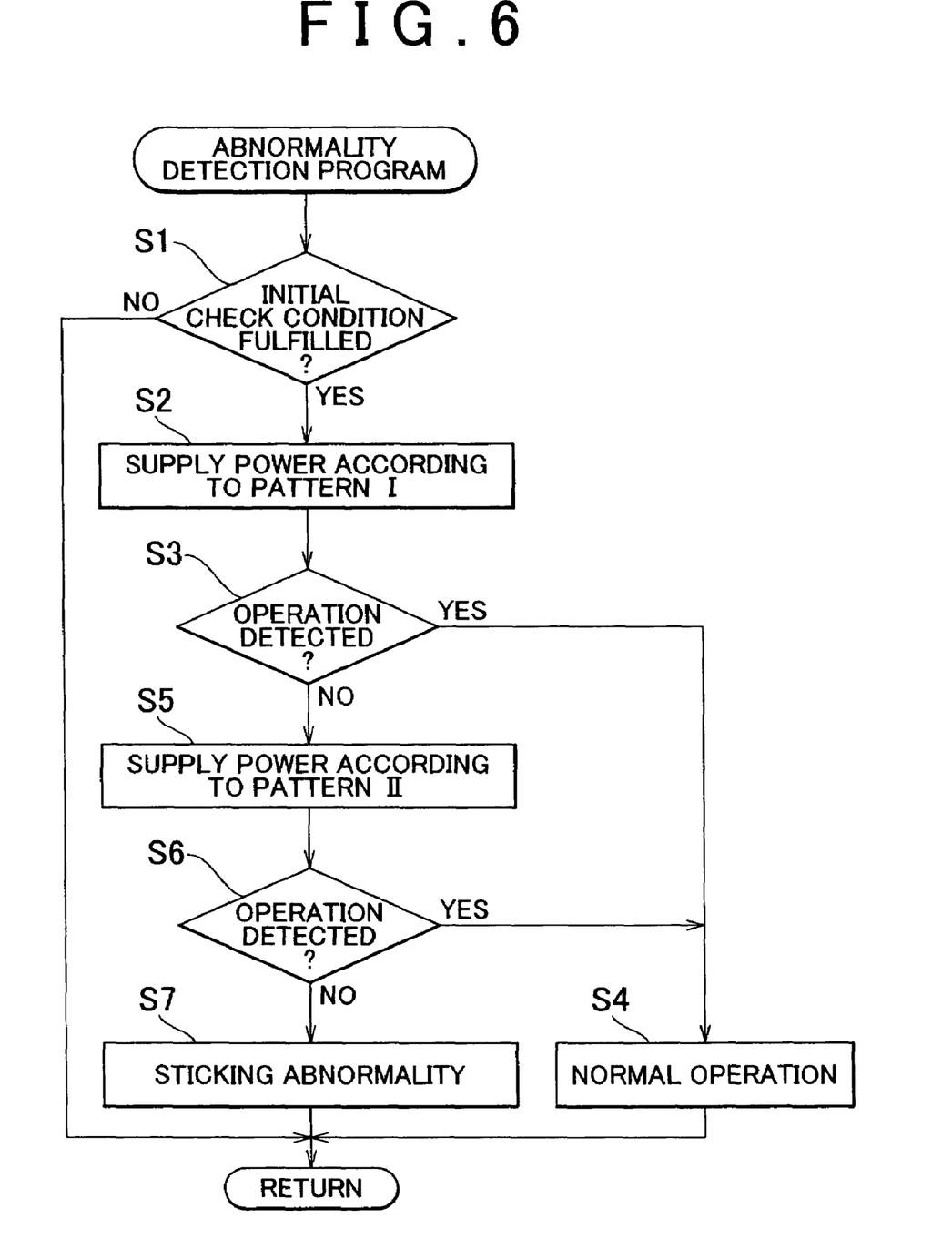
FIG. 6 is a flowchart showing an abnormality detection program stored in ROM of the brake ECU.

The check for an abnormality in the exemplary embodiment is performed during the initial check. In step S1 of an abnormality detection program illustrated in the flowchart shown in FIG. 6, it is determined whether an initial check condition has been fulfilled. The initial check timing may be, for example, when a condition that the vehicle is substantially stopped and the brake pedal 10 is not being operated initially after the ignition switch 224 has been switched from OFF to ON. Whether the brake pedal 10 is being operated can be detected based on the state of the brake switch 211. A vehicle speed sensor may be provided and whether the vehicle is substantially stopped may be determined based on whether the running speed detected by the vehicle speed sensor is equal to, or less than, a predetermined speed. Alternatively, an estimated vehicle body speed may be obtained based on the wheel speed detected by the wheel speed sensor 218 and whether the vehicle is substantially stopped may be determined based on whether that estimated vehicle body speed is equal to, or less than, a predetermined speed.

When the initial check condition has been fulfilled, the determination in step S1 is YES and in step S2 electricity according to a predetermined pattern is supplied as shown in FIG. 5. Voltage of a constant level is applied for a predetermined power ON time, after which the electricity is gradually reduced. Further, in step S3, it is determined whether the linear valve has been operated. When operation of the linear valve has been detected, the determination is YES and that linear valve is determined to be operating normally in step S4. On the other hand, when operation of the linear valve is not detected, electricity is supplied in step S5 according to the pattern shown in FIG. 9. The power ON time is longer than it is in step S2. Then in step S6 it is determined whether the linear valve has been operated. When operation of the linear valve is detected, the determination is YES and the linear valve is determined in step S4 to be operating normally. When no operation of the linear valve is detected, the determination is NO and it is determined in step S7 that there is a sticking abnormality.

Accordingly, the exemplary embodiment enables noise generated during the abnormality check to be reduced. It also enables the time required for performing the abnormality check to be shortened. Further, because the pressure decrease linear valves 57 and 58 are closed when the check of the rear wheel pressure increase linear valves 52 and 53 is performed, when no movement of the plunger 78 is detected in step S3, the fluid pressures of the brake cylinders 22 and 23 can be immediately raised in step S5 even if the brake is operated during the abnormality check when the power ON time is extended. As described above, in the exemplary embodiment, the current control devices include portions of the brake ECU 200 that control the electricity supplied to the linear valves, and the like. An electricity control portion for detecting abnormalities is formed of a portion of the brake ECU 200 in which is stored step S2 of the abnormality detection program illustrated in the flowchart shown in FIG. 6, and a portion of the brake ECU 200 for executing that step, and the like, from among the current control devices. An electricity increase portion of the brake ECU 200 for increasing the amount of electricity to be supplied is formed of a portion in which step S5 is stored and a portion of the brake ECU 200 for executing that step, and the like, from among the current control devices. Also, a sticking abnormality detecting apparatus is formed of a portion of the brake ECU 200 in which are stored steps S3, S6, and S7, and a portion of the brake ECU 200 for executing those steps, and the like.

Figure 7:
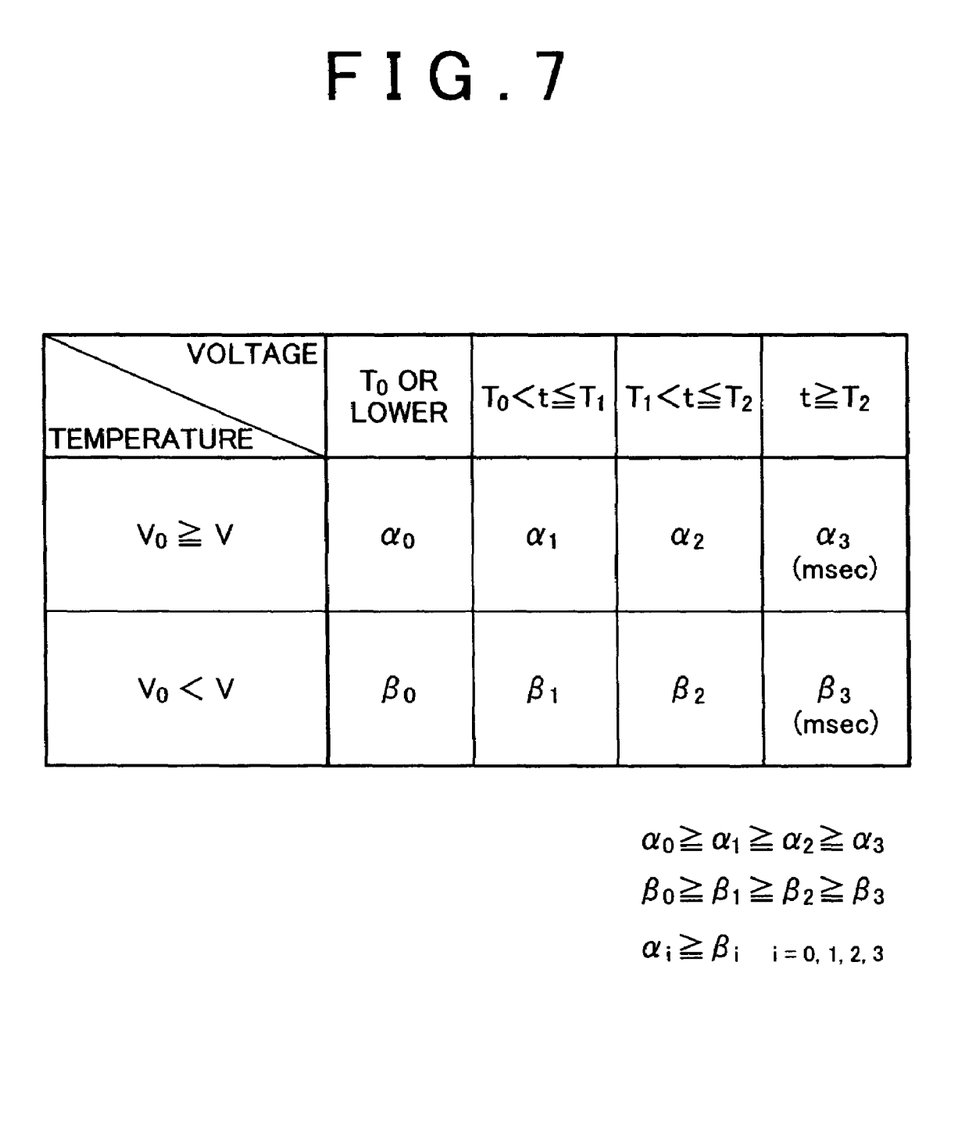
FIG. 7 is a map showing a table of the relationship between brake fluid temperature and power ON time, which is stored in the ROM of the brake ECU.

In the exemplary embodiment, the amount of electricity supplied to the coils 76 and 86 is determined in advance. Alternatively, however, the amount of electricity that is supplied may be determined at each time according to the temperature of the brake fluid. The temperature of the brake fluid may be detected directly or indirectly using the outside air temperature, the ambient temperature, or the like. During the initial check, the temperature of the brake fluid may be made substantially the same as the outside air temperature or the ambient temperature. In this exemplary embodiment, the relationship between the outside air temperature t, as the temperature of the brake fluid, the power ON times $\alpha$ and $\beta$, and the applied voltage V is stored in table form beforehand, as shown in FIG. 7. The power ON times $\alpha$ and $\beta$ are determined based on the detected temperature t, the voltage V, and the table. The power ON times $\alpha$ and $\beta$ are longer when the temperature t is low than when it is high ($\alpha 0 \geq \alpha 1 \geq \alpha 2 \geq \alpha 3$, $\beta 0 \geq \beta 1 \geq \beta 2 \geq \beta 3$), and the power ON time $\beta$ when the applied voltage V is high (V>V0) is shorter than the power ON time $\alpha$ when the applied voltage V is low (V0$\geq$v) ($\alpha i \geq \beta i$; i=0, 1, 2, 3). The power ON times $\alpha$ and $\beta$ in this case correspond to the time TON in FIG. 5 and the electricity is gradually reduced after the time TON passes. The level of the applied voltage is usually higher than a preset voltage V0 but it may be equal to, or less than, the preset voltage V0 due to a drop in the source voltage or the like.

Figure 8:
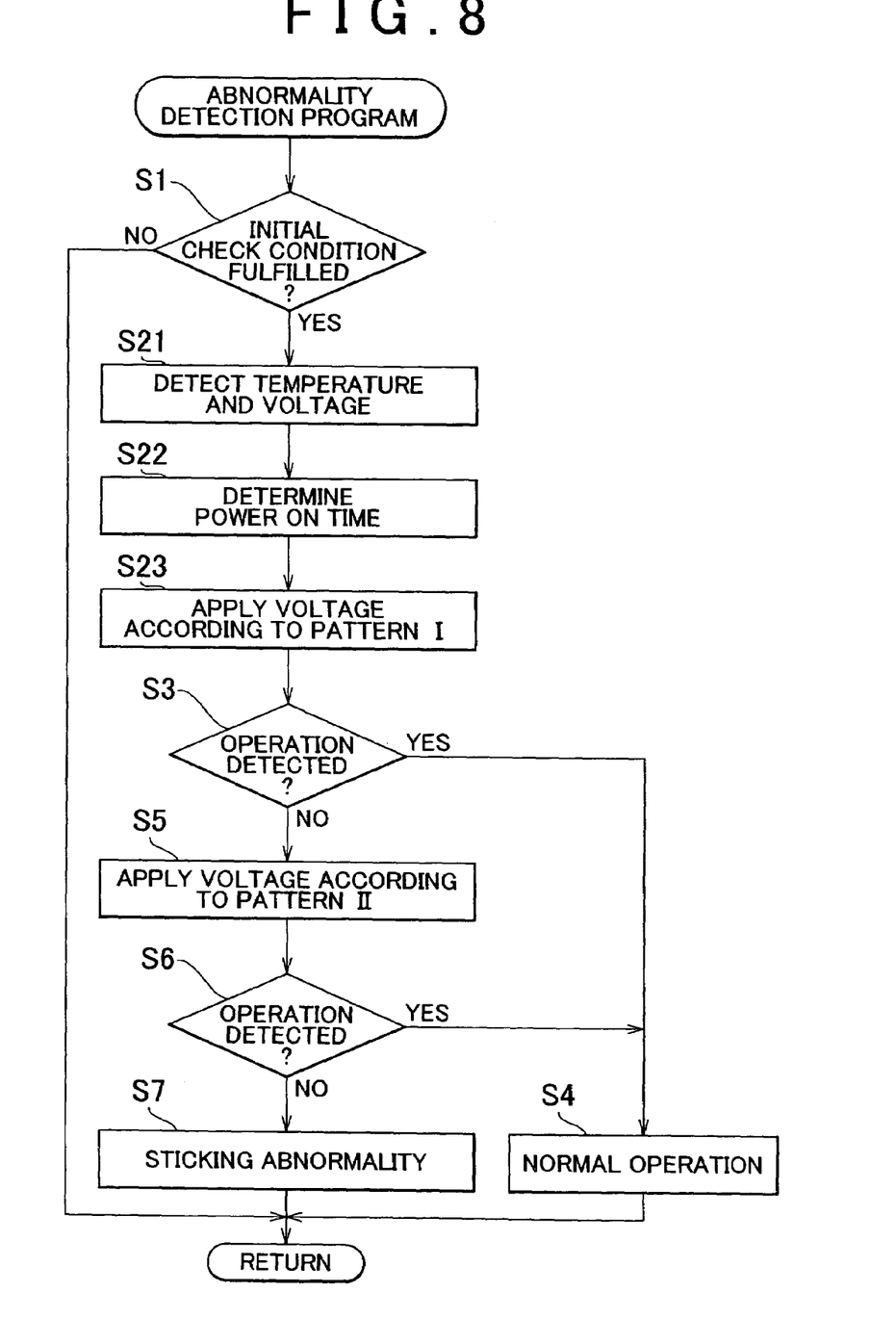
FIG. 8 is a flowchart showing the abnormality detection program stored in the ROM of the brake ECU of the brake fluid pressure control device as an electromagnetic valve control device according to another exemplary embodiment of the invention.

In the abnormality detection program illustrated in the flowchart in FIG. 8, when the initial check condition has been fulfilled, the outside air temperature is detected by the outside air detecting device 226 and the voltage is detected by the voltage detecting portion 230 in step S21. Then in step S22, the power ON time is determined according to the table illustrated in the map shown in FIG. 7, and in step S23 the electricity according to that map is supplied. Then in step S3 it is determined whether the linear valve has been operated. If operation of the linear valve is detected, it is determined in step S4 that the linear valve is operating normally, but if operation of the linear valve is not detected, the power ON time is extended, as described above, in step S5. Steps S6 and thereafter are executed as in the first exemplary embodiment. Thus, according to this exemplary embodiment, because the power ON time is determined according to the temperature of the brake fluid, an amount of electricity appropriate for the conditions at that point can be supplied. Also, if the electricity supplied is too little with respect to the temperature of the brake fluid, it is possible that the linear valve may be falsely detected as being stuck. According to this exemplary embodiment, however, because an amount of electricity that is appropriate for the temperature of the brake fluid is supplied, a false detection of that type is able to be avoided. In the exemplary embodiment, an electricity determining portion that determines the amount of electricity suitable with respect to the brake fluid temperature includes a portion of the brake ECU 200 in which the table illustrated by the map in FIG. 7 is stored, a portion of the brake ECU 200 in which step S22 of the abnormality detection program illustrated by the flowchart in FIG. 8 is stored, and a portion of the brake ECU 200 for executing that step, and the like, from among the foregoing current control devices.

Further, in each of the foregoing exemplary embodiments, when checking for an abnormality in the normally closed (NC) valve, electricity of an amount such that the back face 250 of the plunger 78 does not abut against the receiving face 252 of the fixed portion 77 is supplied in step S2. The invention, however, is not limited to this. For example, electricity of an amount that is less than the amount of electricity that is supplied during the conventional initial check may be supplied. Also, electricity of an amount that is less than the amount supplied when a command to open the valve is output during normal control may be supplied. In this case, electricity of an amount such that the back face 250 of the plunger 78 abuts, and remains abutted, against the receiving face 252 of the fixed portion 77 may be supplied (for example, electricity for full operation mode, i.e., electricity that is at least a predetermined amount more than the amount required to abut the plunger 78 against the fixed portion 77). The amount of electricity supplied, however, is less than the amount of electricity for full operation supplied in this case. In either case, impact noise generated when the plunger 78 strikes the fixed portion 77 and when the valve 70 strikes the valve seat 71 can be reduced, thus reducing the noise during the abnormality check. Similarly, in the normally open (NO) valve, electricity of an amount less than the amount that places the valve 80 against the valve seat 81 and keeps it there may be supplied.

Also in this exemplary embodiment, the invention is applied in the case where the electromagnetic valve is a normally open (NO) valve as well as in the case where the electromagnetic valve is a normally closed (NC) valve. However, it is possible to apply the invention in the case where the electromagnetic valve is either only a normally closed (NC) valve or only a normally open (NO) valve.

Further, the invention is not limited to a linear valve, but may also be applied to simply an electromagnetic check valve. For example, during the abnormality check of the first and second master cylinder cut-off valves 94 and 95, the first and second connection control valves 104 and 105, and the simulator check valve 134, the current supplied is controlled on and off, and the electricity supplied when the current is on is controlled so as not to become excessive. For example, it is possible to supply electricity of an amount such that the valve does not strike the valve seat, or if the valve does strike the valve seat, the impact noise is less than with the related art. It is also possible to supply electricity of an amount such that the plunger does not strike the fixed portion, or if the plunger does strike the fixed portion, the impact noise is reduced. Accordingly, it is possible to reduce the noise generated during the abnormality check of the electromagnetic check valve.

Further, the invention is not limited to during the initial check, but may also be applied during the abnormality check while running. Also, the brake system to which the electromagnetic valve control device is applied is not limited to that in the foregoing exemplary embodiments. Although the invention has been described herein with reference to specific embodiments, many modifications and variations therein will readily occur to those skilled in the art. Accordingly, all such variations and modifications are included within the intended scope of the invention.

What is claimed is:

1. An electromagnetic valve control system, comprising:
an electromagnetic valve including (i) a seating valve having a valve seat and a valve that can be placed against and separated from the valve seat, and (ii) an electromagnetic driving device which includes a coil retained in a body of the electromagnetic valve and a plunger that moves relative to the body when electricity is supplied to the coil, and which places the valve against, and separates the valve from, the valve seat by moving the plunger; and
a controller including instructions for performing an abnormality check of the electromagnetic valve, wherein the controller is adapted to, during the abnormality check of the electromagnetic valve, supply the coil with electricity of an amount which causes the plunger to move a length shorter than a length of a maximum stroke of the plunger to determine if the electromagnetic valve is operating normally.

2. The electromagnetic valve control system according to claim 1, wherein
the electromagnetic valve includes a spring that urges the valve in a direction to place the valve against the valve seat;
the electromagnetic valve is a normally-closed type electromagnetic valve in which, when electricity is supplied to the coil, the plunger is drawn toward the body of the electromagnetic valve against the urging force of the spring so as to push the valve away from the valve seat; and
the maximum stroke is equal to a length between the position of the plunger when the valve is placed against the valve seat and the position of the plunger when the plunger abuts against the body of the electromagnetic valve.

3. The electromagnetic valve control system according to claim 1, wherein
the electromagnetic valve includes a spring that urges the plunger in a direction to push the valve away from the valve seat;

the electromagnetic valve is a normally-opened type electromagnetic valve in which, when electricity is supplied to the coil, the plunger is drawn against the urging force of the spring so as to place the valve against the valve seat; and the maximum stroke is equal to a length between the position of the plunger when the valve is farthest from the valve seat within a limited range over which the valve can move away from the valve seat and the position of the plunger when the valve is placed against the valve seat.

4. The electromagnetic valve control system according to claim 1, wherein the controller is adapted to detect whether at least one of the plunger and the valve has moved.

5. The electromagnetic valve control system according to claim 4, wherein the controller is adapted to determine at least one of the position of the plunger or the valve relative to the body of the electromagnetic valve and whether the plunger or the valve has been stationary.

6. The electromagnetic valve control system according to claim 5, wherein the controller is adapted to detect at least one of (i) waveform of current flowing through the coil, (ii) noise generated when the plunger strikes the body of the electromagnetic valve or noise generated when the valve strikes the valve seat, (iii) vibration of the electromagnetic valve, and (iv) pressure in high pressure or low pressure side of the electromagnetic valve.

7. The electromagnetic valve control system according to claim 4, wherein the controller is adapted to determine an abnormality in the electromagnetic valve if no movement of at least one of the plunger and the valve is detected even when electricity is supplied to the coil.

8. The electromagnetic valve control system according to claim 4, wherein the controller is adapted to increase an amount of electricity to be supplied to the coil if no movement of at least one of the plunger and the valve seat is not detected even when electricity is supplied to the coil.

9. The electromagnetic valve control system according to claim 1, wherein
the electromagnetic valve is disposed in a fluid line in which a working fluid flows; and
the controller is adapted to detect a temperature of the working fluid and set a larger amount of electricity to be supplied to the coil when the detected temperature is low than when the detected temperature is high.

10. The electromagnetic valve control system according to claim 1, further comprising a brake cylinder that operates using fluid pressure, wherein
the electromagnetic valve is disposed between the brake cylinder and one of a high pressure source and low pressure source; and
the controller is adapted to control the fluid pressure of the brake cylinder by controlling current to be supplied to the coil.

11. The electromagnetic valve control system according to claim 1, wherein the controller is adapted to, when stopping supplying electricity to the coil, gradually reduce the electricity.

12. An electromagnetic valve control system, comprising:
an electromagnetic valve including (i) a seating valve having a valve seat and a valve that can be placed against and separated from the valve seat, and (ii) an electromagnetic driving device which includes a coil retained in a body of the electromagnetic valve and a plunger that moves relative to the body when electricity is supplied to the coil, and which places the valve against, and separates the valve from, the valve seat by moving the plunger; and
a controller including instructions for performing an abnormality check of the electromagnetic valve, wherein the controller is adapted to, during the abnormality check of the electromagnetic valve, supply the coil with electricity of a smaller amount than an amount which causes the plunger to move from an initial position to and remain in an end of a maximum stroke of the plunger to determine if the electromagnetic valve is operating normally.

13. The electromagnetic valve control system according to claim 12, wherein
the electromagnetic valve includes a spring that urges the valve in a direction to place the valve against the valve seat;
the electromagnetic valve is a normally-closed type electromagnetic valve in which, when electricity is supplied to the coil, the plunger is drawn toward the body of the electromagnetic valve against the urging force of the spring so as to push the valve away from the valve seat; and
the maximum stroke is equal to a length between the position of the plunger when the valve is placed against the valve seat and the position of the plunger when the plunger abuts against the body of the electromagnetic valve.

14. The electromagnetic valve control system according to claim 12, wherein
the electromagnetic valve includes a spring that urges the plunger in a direction to push the valve away from the valve seat;
the electromagnetic valve is a normally-opened type electromagnetic valve in which, when electricity is supplied to the coil, the plunger is drawn against the urging force of the spring so as to place the valve against the valve seat;
the maximum stroke is equal to a length between the position of the plunger when the valve is farthest from the valve seat within a limited range over which the valve can move away from the valve seat and the position of the plunger when the valve is placed against the valve seat.

15. The electromagnetic valve control system according to claim 12, wherein the controller is adapted to detect whether at least one of the plunger and the valve has moved.

16. The electromagnetic valve control system according to claim 15, wherein the controller is adapted to determine at least one of the position of the plunger or the valve relative to the body of the electromagnetic valve and whether the plunger or the valve has been stationary.

17. The electromagnetic valve control system according to claim 16, wherein the controller is adapted to detect at least one of (i) waveform of current flowing through the coil, (ii) noise generated when the plunger strikes the body of the electromagnetic valve or noise generated when the valve strikes the valve seat, (iii) vibration of the electromagnetic valve, and (iv) pressure in high pressure or low pressure side of the electromagnetic valve.

18. The electromagnetic valve control system according to claim 15, wherein the controller is adapted to determine an abnormality in the electromagnetic valve if no movement of at least one of the plunger and the valve is detected even when electricity is supplied to the coil.

19. The electromagnetic valve control system according to claim 15, wherein the controller is adapted to increase an amount of electricity to be supplied to the coil if no movement of at least one of the plunger or the valve seat is not detected even when electricity is supplied to the coil.

20. The electromagnetic valve control system according to claim 12, wherein
the electromagnetic valve is disposed in a fluid line in which a working fluid flows; and
the controller is adapted to detect a temperature of the working fluid and set a larger amount of electricity to be supplied to the coil when the detected temperature is low than when the detected temperature is high.

21. The electromagnetic valve control system according to claim 12, further comprising a brake cylinder that operates using fluid pressure, wherein the electromagnetic valve is disposed between the brake cylinder and one of a high pressure source and low pressure source; and
the controller is adapted to control the fluid pressure of the brake cylinder by controlling current to be supplied to the coil.

22. The electromagnetic valve control system according to claim 12, wherein the controller is adapted to, when stopping supplying electricity to the coil, gradually reduce the electricity.

23. A method for controlling an electromagnetic valve having (i) a seating valve having a valve seat and a valve that can be placed against and separated from the valve seat, and (ii) an electromagnetic driving device which includes a coil retained in a body of the electromagnetic valve and a plunger that moves relative to the body when electricity is supplied to the coil, and which places the valve against, and separates the valve from, the valve seat by moving the plunger, the method comprising:
performing an abnormality check of the electromagnetic valve, by supplying electricity to the electromagnetic valve of an amount which causes the plunger to move a length shorter than a length of a maximum stroke of the plunger to determine if the electromagnetic valve is operating normally.

24. A method for controlling an electromagnetic valve including (i) a seating valve having a valve seat and a valve that can be placed against and separated from the valve seat, and (ii) an electromagnetic driving device which includes a coil retained in a body of the electromagnetic valve and a plunger that moves relative to the body when electricity is supplied to the coil, and which places the valve against, and separates the valve from, the valve seat by moving the plunger, the method comprising
performing an abnormality check of the electromagnetic valve, by supplying the electromagnetic valve with electricity of a smaller amount than an amount which causes the plunger to move from an initial position to and remain in an end of a maximum stroke of the plunger to determine if the electromagnetic valve is operating normally.

* * * * *